(12) United States Patent
Slusarczyk et al.

(10) Patent No.: US 9,657,803 B2
(45) Date of Patent: May 23, 2017

(54) HYDRAULIC DAMPER WITH A HYDRAULIC STOP ARRANGEMENT

(71) Applicants: Pawel Slusarczyk, Krakow (PL); Marcin Knapczyk, Krakow (PL); Jakub Wrzesinski, Krakow (PL)

(72) Inventors: Pawel Slusarczyk, Krakow (PL); Marcin Knapczyk, Krakow (PL); Jakub Wrzesinski, Krakow (PL)

(73) Assignee: Beijingwest Industries Co., Ltd., Beijing (CN)

( * ) Notice: Subject to any disclaimer, the term of this patent is extended or adjusted under 35 U.S.C. 154(b) by 75 days.

(21) Appl. No.: 14/511,577

(22) Filed: Oct. 10, 2014

(65) Prior Publication Data

US 2015/0330475 A1     Nov. 19, 2015

(30) Foreign Application Priority Data

May 14, 2014   (CN) .......................... 2014 1 0203424

(51) Int. Cl.
*F16F 9/48*     (2006.01)
*F16F 9/32*     (2006.01)
(Continued)

(52) U.S. Cl.
CPC ................ *F16F 9/49* (2013.01); *B21D 22/02* (2013.01); *B21D 22/20* (2013.01); *B21D 53/88* (2013.01);
(Continued)

(58) Field of Classification Search
CPC ............. F16F 9/483; F16F 9/49; F16F 9/3242
See application file for complete search history.

(56) References Cited

U.S. PATENT DOCUMENTS 3,175,645 A   3/1965   Schafer et al.
3,447,644 A   6/1969   Duckett
(Continued)

FOREIGN PATENT DOCUMENTS

DE     8130523 U1    2/1982
DE    10317190 A1    7/2004
(Continued)

OTHER PUBLICATIONS

European Search Report; Dated Jun. 23, 2016, 7 Pages.

*Primary Examiner* — Anna Momper
(74) *Attorney, Agent, or Firm* — William H. Honaker; Dickinson Wright PLLC

(57) ABSTRACT

A hydraulic damper (1) includes a tube (3) filled with working liquid, wherein at least one end of the tube (3) is provided with a narrower section (31) of a smaller diameter provided with at least one axial groove (12). The damper (1) includes at least one additional piston assembly (13) having diameter (D3) smaller than diameter (D1) of the main section of the tube (3), displaceable along with the main piston assembly (4) and apt to be introduced in the narrower section of the tube (3) to generate additional damping force. The narrower section (31) extends through a conical section (32) into the main section (33) of the tube (3) and the conical section (32) of the tube (3) is internally shaped to form axial bridges (15) defining said axial grooves (12) extending along the length of said conical section (32), each comprising a cylindrical section (151).

15 Claims, 5 Drawing Sheets

(51) Int. Cl.
  *F16F 9/49* (2006.01)
  *B21D 22/20* (2006.01)
  *B21D 22/02* (2006.01)
  *B21D 53/88* (2006.01)

(52) U.S. Cl.
  CPC .......... *F16F 9/3235* (2013.01); *F16F 9/3242* (2013.01); *F16F 9/483* (2013.01)

(56) References Cited

U.S. PATENT DOCUMENTS

| | | | |
|---|---|---|---|
| 4,230,309 A | | 10/1980 | Schnitzius |
| 4,356,898 A | * | 11/1982 | Guzder ................. F16F 9/3482 188/280 |
| 4,484,670 A | * | 11/1984 | Axthammer ......... B60G 13/006 188/322.19 |
| 5,157,806 A | | 10/1992 | Wartian |
| 6,425,279 B1 | * | 7/2002 | Jeffries ................... B21C 37/20 267/64.15 |
| 2005/0077131 A1 | | 4/2005 | Russell |
| 2006/0016650 A1 | | 1/2006 | Kneip et al. |
| 2011/0017558 A1 | | 1/2011 | Nygren et al. |
| 2012/0061194 A1 | | 3/2012 | Yu |
| 2012/0090931 A1 | * | 4/2012 | Krazewski ............. B60G 13/08 188/288 |

FOREIGN PATENT DOCUMENTS

| | | |
|---|---|---|
| DE | 102005009762 A1 | 9/2006 |
| DE | 10205030403 A1 | 1/2007 |
| DE | 102011089140 B3 | 3/2013 |
| EP | 0565832 A1 | 10/1993 |
| EP | 0753684 A1 | 1/1997 |
| EP | 1944402 A1 | 7/2008 |
| EP | 2302252 A1 | 3/2011 |
| EP | 2302252 A1 | 3/2011 |
| EP | 2366915 A2 | 9/2011 |
| FR | 2974609 A1 | 11/2012 |
| WO | WO 2009079791 A1 * | 7/2009 ............. F24H 1/201 |

* cited by examiner

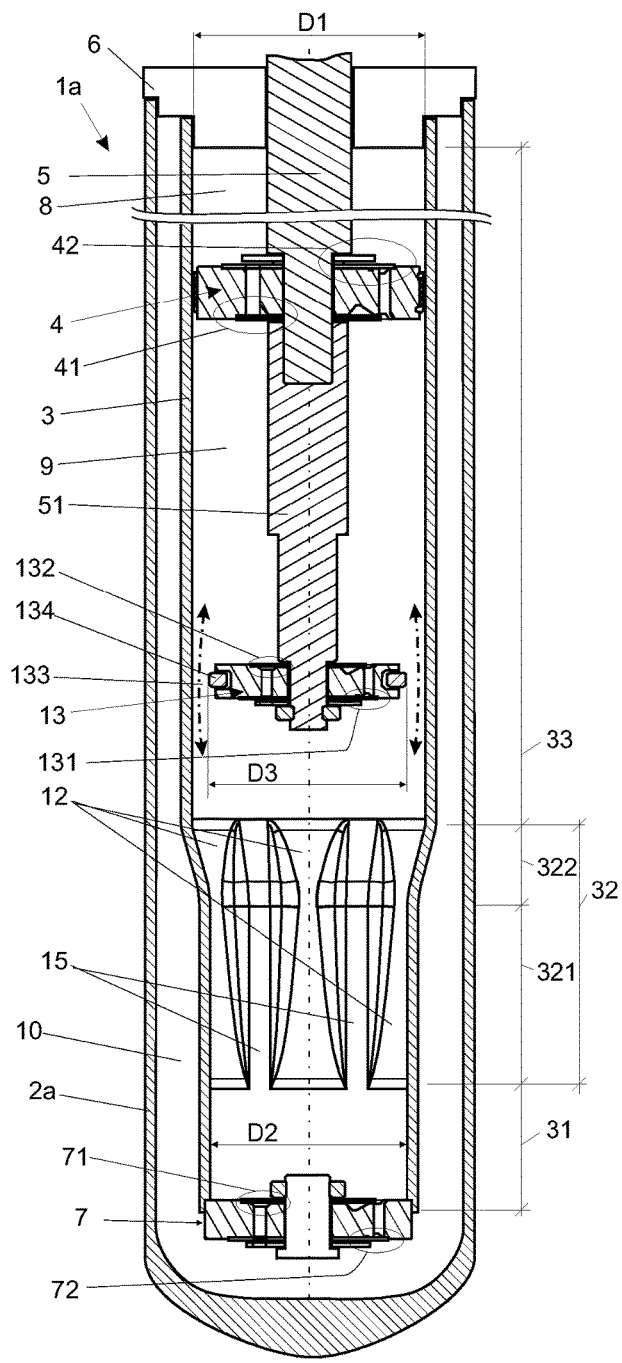
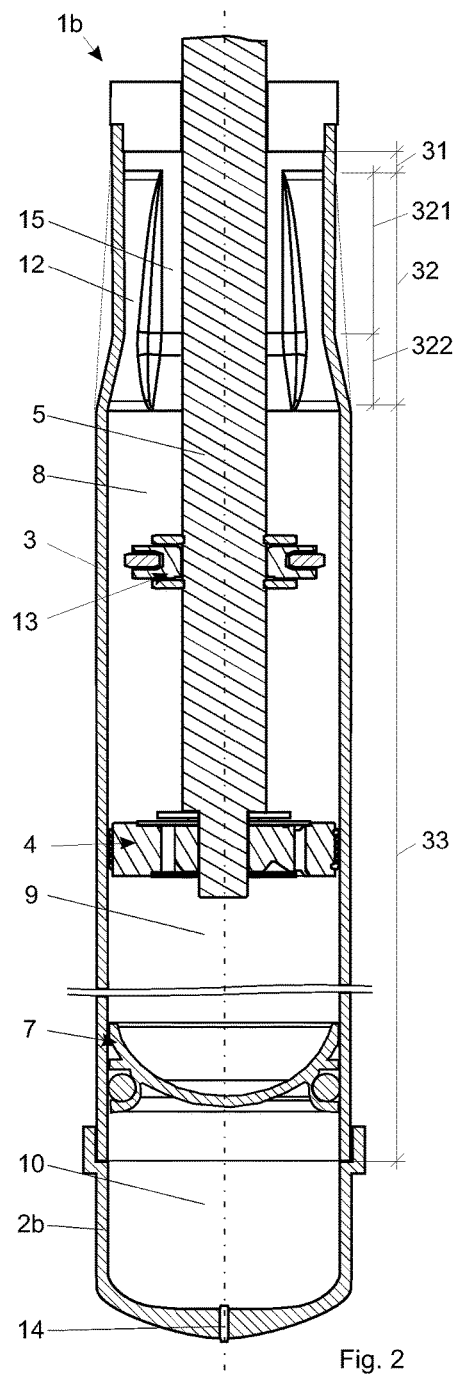
Fig. 1
Fig. 2

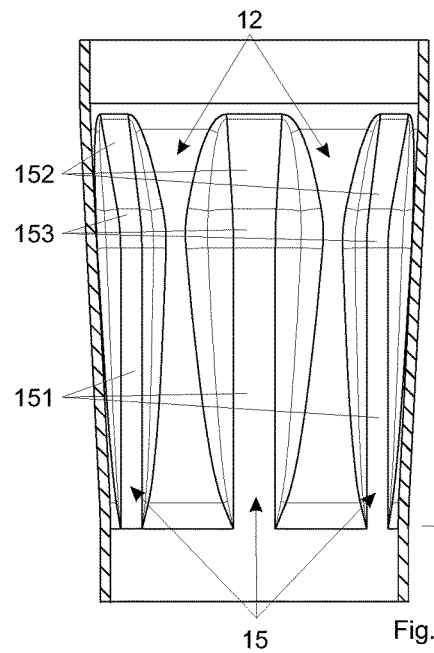
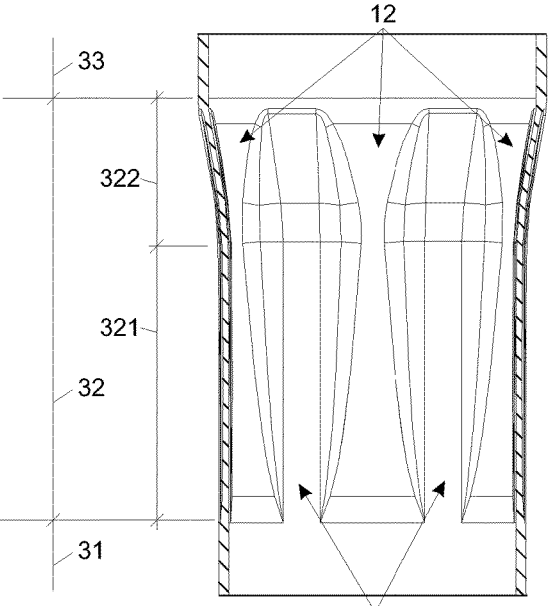
Fig. 5a
Fig. 5b
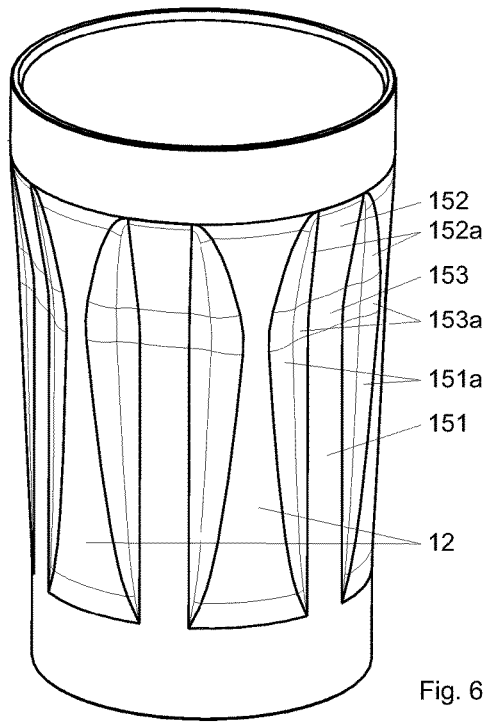
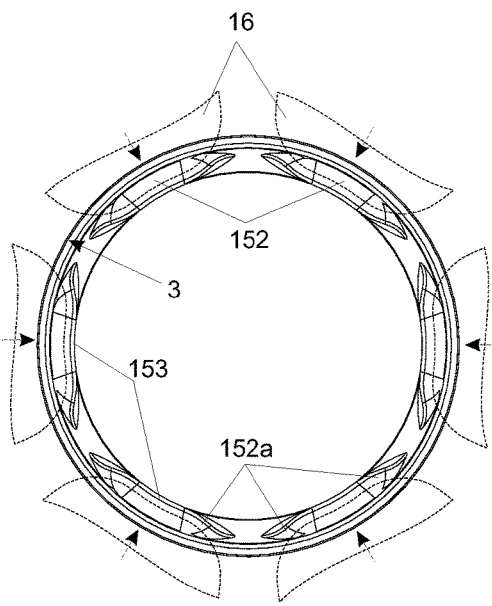
Fig. 6
Fig. 7

HYDRAULIC DAMPER WITH A HYDRAULIC STOP ARRANGEMENT

CROSS REFERENCE TO RELATED APPLICATIONS

The subject application claims priority to Chinese Patent Application No. 201410203424.8 filed May 14, 2014, entitled a "Hydraulic Damper with a Hydraulic Stop Arrangement".

BACKGROUND OF THE INVENTION

The invention relates to a hydraulic damper, in particular a motor vehicle hydraulic suspension damper, comprising a tube filled with working liquid, a main piston assembly disposed slidably inside the main section of the tube, attached to a piston rod led outside the damper and dividing the tube into a rebound chamber and a compression chamber, rebound and compression valve assemblies to control the flow of working liquid within the tube during a rebound and compression stroke of the damper, wherein at least one end of the tube is provided with a narrower section of a smaller diameter provided at least partially with at least one axial groove and the damper is further provided with at least one additional piston assembly having diameter smaller than diameter of the main section of the tube, displaceable along with the main piston assembly and apt to be introduced in said conical section of the tube to generate additional damping force.

The additional piston assembly that may slidably displace while inside the narrower section of the tube forms a so called hydraulic stop arrangement that generates additional damping force over a predefined end section of an operating range of piston rod travel.

Exemplary dampers provided with such a hydraulic stop arrangements are disclosed in patent publications U.S. Pat. No. 3,447,644 and EP 2 302 252 A1.

Document U.S. Pat. No. 3,447,644 discloses a damper including subsidiary control means comprising a part positioned adjacent to at least one end of the tube and constituting a subsidiary cylinder and a subsidiary piston on a piston rod arranged to enter said subsidiary cylinder when a main piston assembly approaches such end of the tube, said subsidiary piston and cylinder being a close but free sliding fit and formed to provide a leakage path the cross sectional area of which after entry of the subsidiary piston into engagement with the subsidiary cylinder progressively diminishes with further movement of said subsidiary piston into said subsidiary cylinder. The absorber furthermore comprises subsidiary passage means separate and apart from the rebound and compression valves of the main piston assembly for flow of fluid into and out of said subsidiary cylinder when engaged by said subsidiary piston, and non-return valve means controlling said subsidiary passage means.

European patent application EP 2 302 252 A1 discloses a hydraulic damper with a hydraulic rebound stop. The shock absorber comprising a main tube divided, by a piston rod extending through the extension chamber. The shock absorber is further provided with a hydraulic rebound stop, called HRS fixed in the rebound chamber and comprising additional tube restricting the main tube, a piston freely slidably mounted on the rod and having a diameter adjusted to the additional tube and being provided with at least one fluid-passage substantially axially oriented. The axial displacements of the HRS-piston are limited between a Rebound-stop and a HRS-ring, both fixed to the rod. The fluid-passage is open to a flow of fluid when in abutment against the HRS-ring and being sealed when in abutment against the Rebound-stop. The HRS is further provided with at least one fluid-passage connecting the HRS-chamber to the extension chamber and providing to the fluid a way out for an exiting flow generating a HRS-damping which is tunable and varies as the HRS-piston penetrates the HRS-tube, their relative position determining the size of the way-out.

These known solutions enable for generation of additional damping force depending mainly on the position of a piston rod. In a majority of these solutions a narrower section of the tube has a form of an additional insert of a decreased inner diameter fixed inside the main tube of a damper. This additional component obviously increases the cost of a damper and leads to complications in its assembling process.

Furthermore the increase of a damping force in hydraulic stop arrangements known in the state of art is usually excessively abrupt, which causes various problems (such as additional stresses acting on the HRS-piston sealing rings) during the phase when the additional piston assembly enters the narrower section of the tube.

It has been the object of the present invention to provide a hydraulic damper with a hydraulic stop arrangement of a simple construction providing a smooth increase of damping force which would be cost efficient and simple to manufacture.

SUMMARY OF THE INVENTION

Therefore, a damper of the kind mentioned in the outset, according to the present invention is characterised in that said narrower section extends through a conical section into the main section of the tube and said conical section is internally shaped to form a number of axial bridges defining said axial grooves extending along the length of said conical section, each comprising a cylindrical section and a conical section, wherein said cylindrical sections of the bridges define a semi-cylindrical section to provide guidance for said at least one additional piston assembly.

Preferably said axial bridges further comprise conical sections defining a semi-conical section.

Such a shaping of a hydraulic stop provides a smooth and adjustable increase of damping force while the additional piston assembly enters said semi-conical section of the damper tube and slides further to said semi-cylindrical section.

Preferably said additional piston assembly is provided with rebound and compression valve assemblies to control the flow of working liquid passing through the additional piston assembly.

Axial bridges preferably comprise annular sections at both sides of respective cylindrical and conical sections defining cross-sectional areas of the grooves between the bridges in a plane perpendicular to the damper axis.

Such a shaping and valve assemblies also provide additional tuning parameters an increase of the damping force within the hydraulic stop arrangement.

The hydraulic stop arrangement according to the present invention may be easily configured to generate additional damping force both for compression and rebound strokes enabling for wide range tuning of force gains, wherein the performance of the arrangement may depend both on the piston position as well as on the piston velocity.

The invention also provides a method of manufacturing a damper of the kind mentioned in the outset, which according to the present invention is characterised in that it comprises the steps of shaping the tube to form a conical section between said narrower section and the main section of the tube, and shaping said conical section of the tube in order to form a number of axial bridges defining said axial grooves extending along the length of said conical section, each comprising a cylindrical section, wherein said cylindrical sections of the bridges define a semi-cylindrical section to provide guidance for said at least one additional piston assembly.

Preferably said step of shaping the tube to form said conical section involves drawing, while said step of shaping said conical section of the tube preferably involves externally stamping said conical section radially by stamps shaping the bridges.

BRIEF DESCRIPTION OF THE DRAWINGS

The invention shall be described and explained below in connection with the attached drawings on which:

FIG. 1 is a schematic cross-sectional view of an embodiment of a twin-tube damper according to the present invention with a hydraulic compression stop, FIG. 2 is a schematic cross-sectional view of an embodiment of a mono-tube damper according to the present invention with a hydraulic rebound stop, FIGS. 5a and 5b are cross-sectional views showing shaping of the damper tube within the area of the hydraulic stop along two axial planes rotated by 30° with respect to each other, FIG. 6 is a schematic perspective view showing shaping of the damper tube within the area of the hydraulic stop, FIG. 7 is a schematic top view illustrating the shaping of the damper tube within the area of the hydraulic stop.

DETAILED DESCRIPTION OF PREFERRED EMBODIMENTS

Figure 3A:
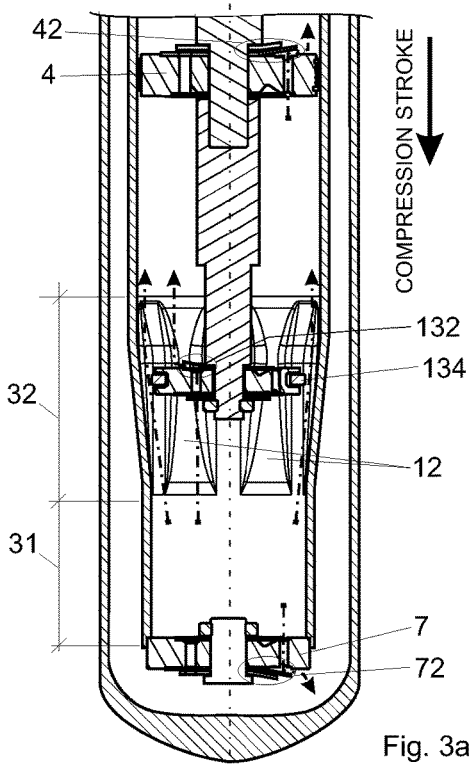
FIGS. 3a and 3b are schematic cross-sectional views illustrating the operation of a hydraulic compression stop of the twin-tube damper shown in FIG. 1 during compression stroke.

Reference numerals to functionally equivalent elements remain the same on all figures of the drawing, wherein where appropriate, they are supplemented with additional suffixes (a, b) to differentiate elements of the same functionality but different construction.

FIG. 1 presents an embodiment of a twin-tube damper 1a according to the present invention that may be employed in a typical motor vehicle suspension. The damper 1a comprises an external tube 2a and a main tube 3 filled with viscous working liquid inside of which a movable main piston assembly 4 attached to a piston rod 5 led outside the damper 1a through a sealed piston rod guide 6 is disposed. The damper 1a is also provided with a base valve assembly 7 fixed at the end of the main tube 3. The piston assembly 4 makes a sliding fit with the inner surface of the main tube 3 and divides the tube 3 into a rebound chamber 8 (defined above the main piston assembly 4) and a compression chamber 9 (defined between the main piston assembly 4 and the base valve assembly 7). An additional compensation chamber 10 is located at the other side of the base valve assembly 7.

The main piston assembly 4 is provided with compression 42 and rebound 41 valve assemblies to control the flow of working liquid passing between the rebound chamber 8 and the compression chamber 9 while the main piston assembly 4 is in motion. Also the base valve assembly 7 is provided with rebound 71 and compression 72 valve assemblies to control the flow of working liquid passing between the additional compensation chamber 10 and the compression chamber 9, respectively, during rebound and compression stroke of the damper 1a. Valve assemblies 41, 42 and 71, 72 provide design parameters that may be used to shape desired characteristic of the damper 1a.

Main section 33 of the tube 3 has a diameter D1 that in this embodiment amounts 32 mm. As shown the tube 3 has a narrower cylindrical section 31 of a smaller diameter D2 that in this embodiment amounts 28 mm. This narrower cylindrical section 31 extends through a conical section 32 into the main cylindrical section 33 of the tube. The conical section 32 of the tube also comprises a semi-cylindrical section 321 and a semi-conical section 322 shaped to define six axial grooves 12 separated by bridges 15 and extending along the length of the conical section 32.

An additional piston assembly 13 displaceable along with the main piston assembly 4 is coaxially fixed with the main piston assembly 4 by means of an additional rod 51 screwed onto the threaded end of the main piston rod 5. The external diameter D3 of the additional piston assembly 13 is smaller than diameter D1 of the main section 33 of the tube 3, so that an annular channel 133 is defined over the perimeter of the additional piston assembly 13 for a flow of working liquid while it is located within the main section 33 of the tube 3. Furthermore the additional piston assembly 13 is provided with rebound 131 and compression 132 valve assemblies, in a form of axial through channels covered by resilient discs, to control the flow of working liquid passing through the additional piston assembly 13 especially while it is located in the narrower section 31 of the tube 3.

The additional piston assembly 13 is also provided with a sealing ring 134 split over its perimeter and fitted in a circumferential groove of the piston assembly 13. This split sealing ring 134 provides sufficient sealing while the piston assembly 13 moves within the narrower section 31 of the tube 3. However due to this split of the sealing ring 134, the external diameter D3 of the additional piston assembly 13 is slightly larger than the diameter D2 of the narrower cylindrical section 31 while the piston assembly 13 moves within the main section 33. In this embodiment the external diameter D3 of the additional piston assembly 13 amounts about 28.3 mm.

Such a shape of the tube and the additional piston assembly 13 provide a hydraulic compression stop for the damper 1a that shall be explained later with reference to FIG. 3 and FIG. 4.

FIG. 2 presents another embodiment of a mono-tube damper 1b according to the present invention with a hydraulic rebound stop of the construction similar to the one illustrated in FIG. 1. As shown here a narrower section 31 of a damper tube 3 and a conical section 32 with the grooves 12 are located at the rebound end of the tube and an additional piston assembly 13 fixed to the damper rod 5 at the rebound side of the main piston assembly 4. As known to those skilled in the art a slidable diaphragm 7 separates damper compression chamber 9 from an additional gas compensation chamber 10 and the tube comprises a cap 2b screwed on the end of the main tube 3 and provided with a valve 14 enabling for filling the additional gas compensation chamber 10 with gas after assembly of the dampen.

Obviously a damper according to the present invention may contain hydraulic stops both at the compression and at the rebound side.

Figure 3B:
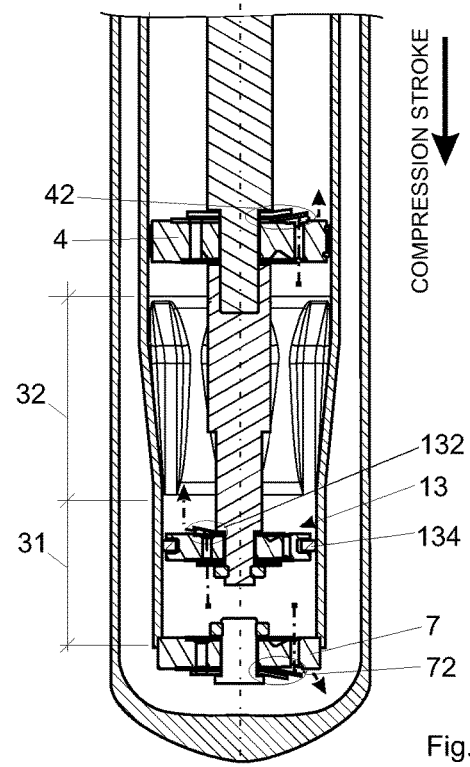
Figure 4A:
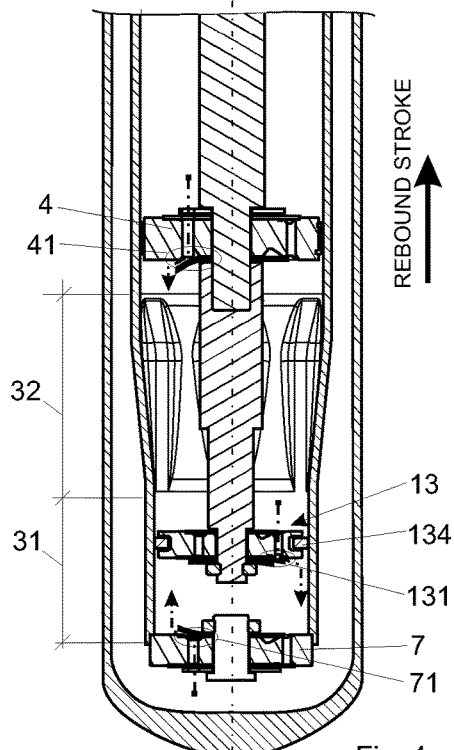
FIGS. 4a and 4b are schematic cross-sectional views illustrating the operation of a hydraulic compression stop of the twin-tube damper shown in FIG. 1 during rebound stroke.
Figure 4B:
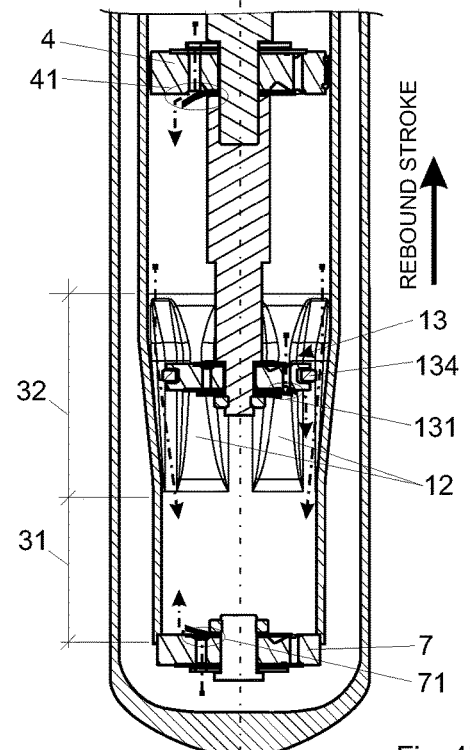

FIG. 3 and FIG. 4 illustrate the operation of a hydraulic compression stop of the twin-tube damper 1a shown in FIG. 1 respectively during compression and rebound strokes.

As shown in FIG. 3a during the travel of the additional piston assembly 13 through the conical section 32 the working liquid flows out of the narrower section 31 around the additional piston assembly 13, through the grooves 12 and through the compression valve assembly 132. Since the external diameter D3 of the additional piston assembly 13 is initially larger than the external diameter D2 of the narrower section 31 of the tube 3, the split sealing ring 134 must be squeezed before it fits the surface of the semi-cylindrical section 321. Therefore the open cross-sectional area defined by the grooves 12 in a plane perpendicular to the damper axis has been designed to be larger at the entry of the semi-conical section 132. This also provides smooth built-up of the damping force not to generate an abrupt force peak.

As shown in FIG. 3b when the additional piston assembly 13 is inside the narrower section 31, the sealing ring 134 forms a sealed engagement with the inner surface of this section 31, and the working liquid may only be evacuated through the compression valve assemblies 132 of the piston assembly 13.

An enlarged fragment of the tube 3 of the damper 1a (or 1b) is shown in FIG. 5 along two axial planes rotated by 30° with respect to each other. As shown the conical section 32 of the tube 3 has been internally shaped to form six equiangularly spaced axial grooves 12 separated by six equiangularly spaced axial bridges 15. Each bridge 15 comprises a cylindrical section 151, a transitional section 153 and a conical section 152. As a result, the conical section 32 of the tube comprises a semi-cylindrical section 321 formed by six equiangularly spaced cylindrical sections 151 of the bridges 15 and a semi-conical section 322 formed by six equiangularly spaced conical sections 152 of the bridges 15, wherein the inclination of semi-conical section 322 is larger than the inclination of the conical section 32 of the tube. Semi-cylindrical section 321 provides guidance for the additional piston assembly 13 while retaining the grooves 12.

As illustrated on FIG. 6 and FIG. 7 the bridges 15 are shaped from outside of the tube 3 using stamps 16 that shall be explained later with reference to FIG. 8 and FIG. 9. Apart of the cylindrical 151, transitional 153 and conical section 152, the stamps also form annular sections 151a, 152a and 153a at both sides of respective sections 151, 152 and 153. These sections 151a, 152a and 153a define the shape and cross-sectional area of the groves 12 between the bridges 15 in a plane perpendicular to the damper axis and provide additional design parameters that may be used to shape desired characteristic of the damper. Sections 151a, 152a and 153a are also shaped to form a smooth transition between a given section 151-153 of the bridge and the internal surface of the conical section 32 of the tube 3 and to this end each section 151a-153a is as illustrated appropriately bend along a line of inflection.

A method of shaping the conical section 32 of the tube 3 in order to form a guiding surface of a hydraulic stop is illustrated with reference to FIGS. 7-9. The initial shape of the tube 3 containing two cylindrical sections 31 and 33 and the conical section 32 may be advantageously prepared by drawing or any other process known from the prior art.

Figure 8A:
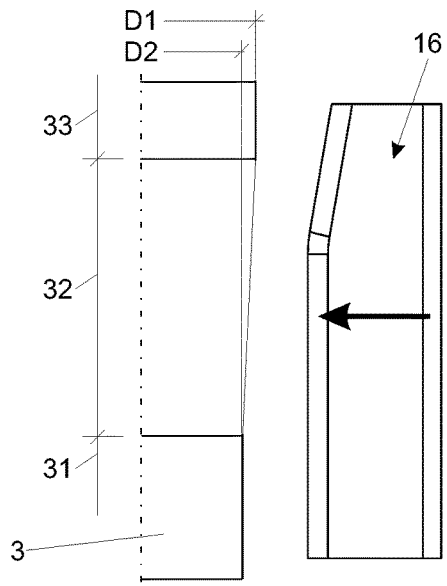
FIGS. 8a and 8b illustrate the process of shaping the damper tube by means of a stamp according to the present invention.
Figure 8B:
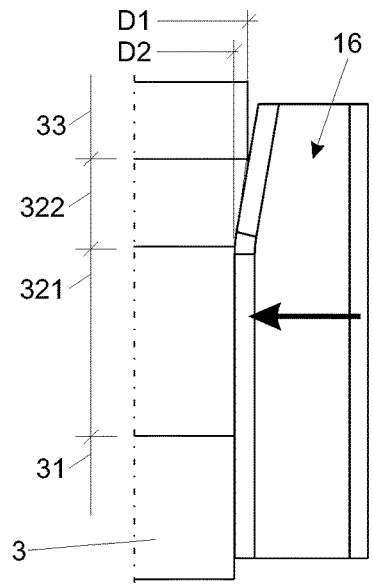
Figure 9A:
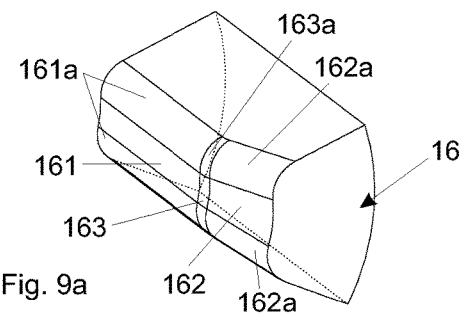
FIG. 9 illustrates a stamp according to the present invention respectively in perspective (FIG. 9a), top (FIG. 9b), front (FIG. 9c) and side (FIG. 9d) views, and FIG. 10 show characteristics of a damping force as a function of the piston displacement, obtained by the inventors during the tests of a damper shown in FIG. 1 compared with a characteristic obtained for an analogous damper but without a hydraulic stop according to the present invention.

As schematically shown in FIG. 7 and FIG. 8 the conical section 32 of the tube 3 is stamped externally by six stamps 16 moving along the radial direction and without any internal die surface. As shown in FIGS. 9a, 9c, and 9d, each stamp has a cylindrical section 161, a transitional section 163 and a conical section 162 during the stamping process each stamp 16 is pressed onto the conical surface 32 of the tube to the point where the stamp cylindrical section 161 abuts the cylindrical section 31 of the tube. As a result the cylindrical section 31 of the tube is enlarged at six sections of its perimeter forming a semi-cylindrical section 321. At the same time the stamp 16 conical section 162 forms a semi-conical section 322 having an inclination larger than that of the conical section 32 of the tube.

Figure 9B:
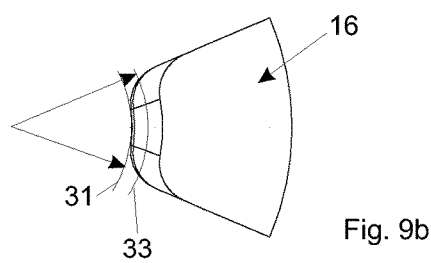
Figure 9C:
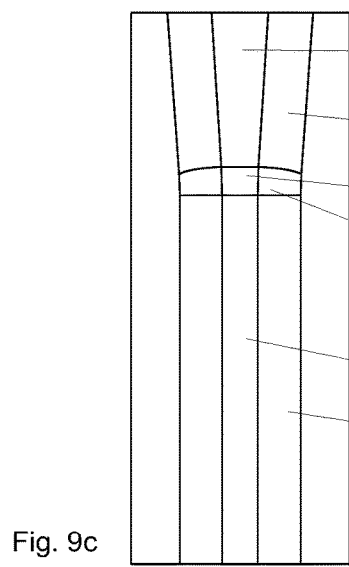
Figure 9D:
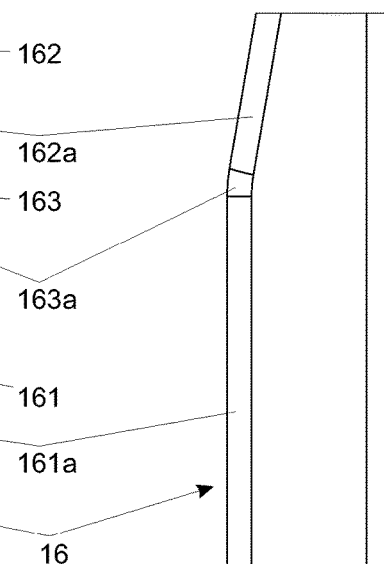

As shown in FIG. 9b the sections 161-163 of the stamp 16 shaping the internal surfaces of the bridge are curved in order to reflect the radius of the tube 3.

The stamp 16 is also provided with appropriate cylindrical sections 161a-163a at both sides of sections 161-163 (of the opposite curvatures) for shaping respectively sections 151a-153a of the bridges 15. Obviously the area of deformation of the tube by the stamps may be extended over a given length into the main section of a greater diameter.

Figure 10:
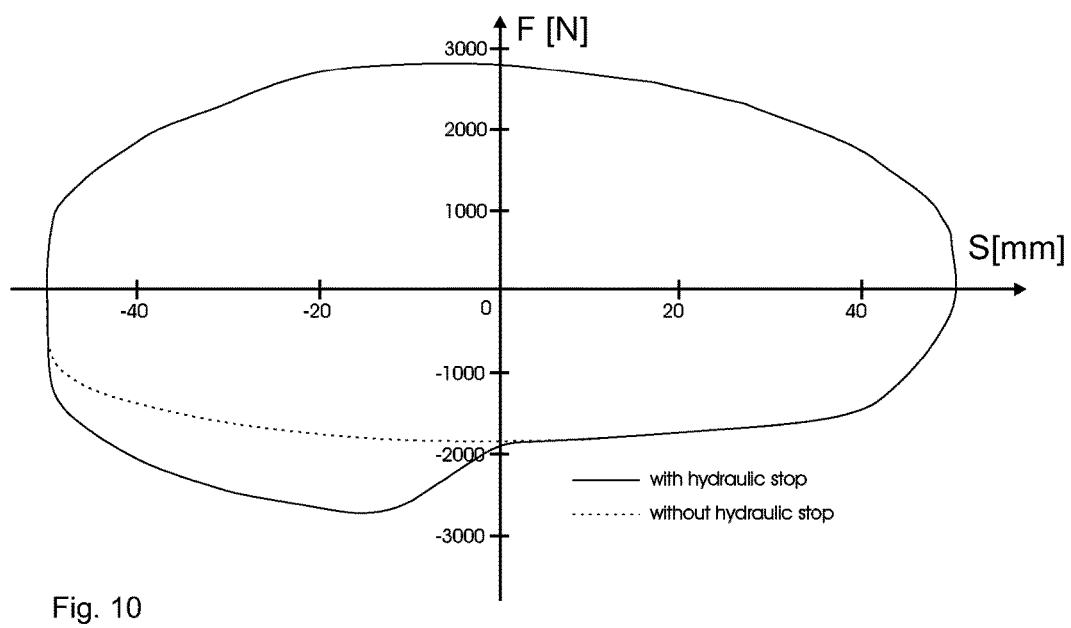

FIG. 10 shows actual characteristics obtained by the inventors during the tests of a damper without a hydraulic stop (dotted line) and the analogous damper shown in FIG. 1 provided the hydraulic stop arrangement according to the present invention (solid line). Both dampers were tested on a rig with the same sinusoidal excitation, ±50 mm amplitude and velocity of 1.5 m/s. As shown the hydraulic stop arrangement smoothly generates an additional damping force while the additional piston assembly 13 enters the semi-conical section 322.

The above embodiments of the present invention are merely exemplary. The figures are not necessarily to scale, and some features may be exaggerated or minimized. These and other factors however should not be considered as limiting the spirit of the invention, the intended scope of protection of which is indicated in appended claims.

What is claimed:

1. A hydraulic damper comprising a tube filled with working liquid, a main piston assembly disposed slidably inside the main section of the tube, attached to a piston rod led outside the damper and dividing the tube into a rebound chamber and a compression chamber, rebound and compression valve assemblies to control the flow of working liquid within the tube during a rebound and compression stroke of the damper, wherein at least one end of the tube is provided with a narrower section of a smaller diameter provided at least partially with at least one axial groove and the damper is further provided with at least one additional piston assembly having a diameter smaller than a diameter of the main section of the tube, displaceable along with the main piston assembly and apt to be introduced in said narrower section of the tube to generate additional damping force;

said narrower section extends through a conical section into the main section of the tube and said conical section is internally shaped to form a plurality of axial bridges extending radially inwardly and defining said at least one axial groove between said axial bridges, and wherein said at least one axial groove extends along the length of said conical section, each of said axial bridges comprising a cylindrical section, a conical section and a transitional section between said cylindrical and conical sections, wherein said cylindrical sections of said axial bridges define a semi-cylindrical section of said tube to provide guidance for said at least one additional piston assembly, and said conical sections of said axial bridges define a semi-conical section of said tube;

said at least one groove having a lower portion extending along the same axial length as said cylindrical sections of said axial bridges, a middle portion extending along the same axial length as said transitional sections of said axial bridges, and an upper portion extending along the same axial length as said conical sections of said bridges; and the width of said lower portion of said at least one groove between said axial bridges tapering inwardly along the length of said lower portion toward said middle portion, and the width of said upper portion of said at least one groove between said axial bridges tapering inwardly along the length of said upper portion toward said middle portion.

2. The hydraulic damper according to claim 1, wherein said additional piston assembly is provided with rebound and compression valve assemblies to control the flow of working liquid passing through the additional piston assembly.

3. The hydraulic damper according to any of the preceding claims, wherein the bridges comprise annular sections at both sides of respective cylindrical and conical sections defining cross-sectional areas of said at least one axial groove between the bridges in a plane perpendicular to the damper axis.

4. The hydraulic damper according to claim 1, wherein it is a twin-tube damper and said conical section is located at the compression end of the damper main tube.

5. The damper according to claim 1, wherein said at least one additional piston assembly is coaxially fixed with said main piston assembly.

6. The damper according to claim 1, wherein said at least one additional piston assembly is provided with a sealing ring split over its perimeter and fitted in a circumferential groove of said at least one additional piston assembly.

7. The damper according to claim 1, wherein said tube extends about and along an axis, and said axial bridges each extend radially inwardly toward said axis.

8. The damper of claim 7, wherein said tube defines an outer surface and an inner surface, and wherein each of said axial bridges defines an indentation on said outer surface of said tube.

9. A method of manufacturing a hydraulic damper, comprising a tube filled with working liquid, a main piston assembly disposed slidably inside the main section of the tube, attached to a piston rod led outside the damper and dividing the tube into a rebound chamber and a compression chamber, rebound and compression valve assemblies to control the flow of working liquid within the tube during a rebound and compression stroke of the damper, wherein at least one end of the tube is provided with a narrower section of a smaller diameter provided at least partially with at least one axial groove and the damper is further provided with at least one additional piston assembly having a diameter smaller than a diameter of the main section of the tube, displaceable along with the main piston assembly and apt to be introduced in said narrower section of the tube to generate additional damping force, wherein the method comprises the steps of:

shaping the tube to form a conical section between said narrower section and the main section of the tube;

shaping said conical section of the tube in order to form a plurality of axial bridges extending radially inwardly and defining said at least one axial groove between said axial bridges, and wherein said at least one groove extends along the length of said conical section, each of said axial bridges comprising a cylindrical section, a conical section and a transitional section between said cylindrical and conical sections, wherein said cylindrical sections of said axial bridges define a semi-cylindrical section of said tube to provide guidance for said at least one additional piston assembly, and said conical sections of said axial bridges define a semi-conical section of said tube;

said at least one groove having a lower portion extending along the same axial length as said cylindrical sections of said axial bridges, a middle portion extending along the same axial length as said transitional sections of said axial bridges, and an upper portion extending along the same axial length as said conical sections of said axial bridges; and the width of said lower portion of said at least one groove between said axial bridges tapering inwardly along the length of said lower portion toward said middle portion, and the width of said upper portion of said at least one groove between said axial bridges tapering inwardly along the length of said upper portion toward said middle portion.

10. The method according to claim 9, wherein said step of shaping the tube to form said conical section involves drawing.

11. The method according to claim 10, wherein said step of shaping said conical section of the tube involves externally stamping said conical section radially by stamps shaping the bridges.

12. The method according to claim 9, wherein said at least one additional piston assembly is coaxially fixed with said main piston assembly.

13. The method according to claim 9, wherein said at least one additional piston assembly is provided with a sealing ring split over its perimeter and fitted in a circumferential groove of said at least one additional piston assembly.

14. The method according to claim 9, wherein said tube extends about and along an axis, and said axial bridges each extend radially inwardly toward said axis.

15. The method of claim 14, wherein said tube defines an outer surface and an inner surface, and wherein each of said axial bridges defines an indentation on said outer surface of said tube.

* * * * *